United States Patent
Thampy et al.

(10) Patent No.: US 10,904,114 B2
(45) Date of Patent: Jan. 26, 2021

(54) KPI TRAJECTORY-DRIVEN OUTLIER DETECTION IN A NETWORK ASSURANCE SERVICE

(71) Applicant: Cisco Technology, Inc., San Jose, CA (US)

(72) Inventors: Sajjit Thampy, San Jose, CA (US); Jean-Philippe Vasseur, Saint Martin d'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 73 days.

(21) Appl. No.: 16/263,323

(22) Filed: Jan. 31, 2019

(65) Prior Publication Data
US 2020/0252310 A1 Aug. 6, 2020

(51) Int. Cl.
*H04L 12/26* (2006.01)
*G06N 20/00* (2019.01)

(52) U.S. Cl.
CPC ............. *H04L 43/04* (2013.01); *G06N 20/00* (2019.01); *H04L 43/0876* (2013.01)

(58) Field of Classification Search
CPC ................... H04L 43/00–50; G06N 20/00–20
See application file for complete search history.

(56) References Cited

U.S. PATENT DOCUMENTS

| | | |
|---|---|---|
| 9,270,549 B2 | 2/2016 | Eidelman et al. |
| 9,439,081 B1 | 9/2016 | Knebl et al. |
| 2016/0088502 A1 | 3/2016 | Sanneck et al. |
| 2017/0272960 A1 | 9/2017 | Li et al. |
| 2017/0329462 A1 | 11/2017 | Maheshwari et al. |
| 2018/0330253 A1* | 11/2018 | Gottschlich ............ G06N 20/00 |
| 2019/0007447 A1* | 1/2019 | Barnes ................... H04L 67/303 |
| 2019/0199589 A1* | 6/2019 | Le ............................ G06N 20/00 |
| 2019/0319859 A1* | 10/2019 | Casey ................. H04L 41/5041 |

OTHER PUBLICATIONS

Fu, Zhouyu et al., "Similarity Based Vehicle Trajectory Clustering and Anomaly Detection", Image Processing 2005. ICIP 2005. IEEE International Conference on., vol. 2, 2005.
Torquato, S. "Effect of dimensionality on the continuum percolation of overlapping hyperspheres and hypercubes." The Journal of chemical physics 136.5 (2012): 054106.
Strohmer, Thomas, "Surprises in High Dimensions", https://www.math.ucdavis.edu/~strohmer/courses/180BigData/180lecture1.pdf, printed Sep. 4, 2019, University of California, Davis, 9 pages.

(Continued)

*Primary Examiner* — Clayton R Williams
(74) *Attorney, Agent, or Firm* — Behmke Innovation Group LLC; Kenneth J. Heywood; Jonathon P. Western

(57) ABSTRACT

In one embodiment, a network assurance service that monitors a network receives a plurality of key performance indicators (KPIs) for a networking device in the network over time. The network assurance service represents relationship changes between the KPIs over time as a set of one or more KPI trajectories. The network assurance service uses a machine learning-based model to determine that a behavior of the networking device is anomalous, based on the one or more KPI trajectories. The network assurance service provides an indication of the anomalous behavior of the networking device to a user interface.

19 Claims, 9 Drawing Sheets

(56) References Cited

OTHER PUBLICATIONS

Jin, Jonathan, "Engineering a Job-based Forecasting Workflow for Observability Anomaly Detection", https://eng.uber.com/observability-anomaly-detection/, May 16, 2018, printed Sep. 4, 2019, Uber Engineering, 9 pages.
Jin, Jonathan, "Implementing Model-Agnosticism in Uber's Real-Time Anomaly Detection Platform", https://eng.uber.com/anomaly-detection/, Feb. 14, 2018, printed Sep. 4, 2019, Uber Engineering, 7 pages.
Turakhia, Chintan, "Engineering More Reliable Transportation with Machine Learning and AI at Uber", https://eng.uber.com/machine-learning/, Nov. 10, 2017, printed Sep. 4, 2019, Uber Engineering, 11 pages.
Laptev, Nikolay et al., "Engineering Extreme Event Forecasting at Uber with Recurrent Neural Networks" https://eng.uber.com/neural-networks/, Jun. 9, 2017, printed Sep. 4, 2019, Uber Engineering, 8 pages.
Romo, Stephanie, "Presenting the Engineering Behind Uber at Our Technology Day" https://eng.uber.com/uber-technology-day/, Apr. 7, 2017, printed Sep. 4, 2019, Uber Engineering, 11 pages.
Lozinski, Lucie, "The Uber Engineering Tech Stack, Part I: The Foundation", https://eng.uber.com/tech-stack-part-one/, Jul. 19, 2016, printed Sep. 4, 2019, Uber Engineering, 11 pages.
Adams, Chris, "How Uber Thinks About Site Reliability Engineering", https://eng.uber.com/sre-talks-feb-2016/, Mar. 3, 2016, printed Sep. 4, 2019, Uber Engineering, 4 pages.
Bell, Franziska, "Identifying Outages with Argos, Uber Engineering's Real-Time Monitoring and Root-Cause Exploration Tool", https://eng.uber.com/argos/, Nov. 24, 2015, printed Sep. 4, 2019, Uber Engineering, 8 pages.

\* cited by examiner

KPI TRAJECTORY-DRIVEN OUTLIER DETECTION IN A NETWORK ASSURANCE SERVICE

TECHNICAL FIELD

The present disclosure relates generally to computer networks, and, more particularly, to key performance indicator (KPI) trajectory-driven outlier detection in a network assurance service.

BACKGROUND

Networks are large-scale distributed systems governed by complex dynamics and very large number of parameters. In general, network assurance involves applying analytics to captured network information, to assess the health of the network. For example, a network assurance service may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

DESCRIPTION OF EXAMPLE EMBODIMENTS

Overview

Figure 1A:
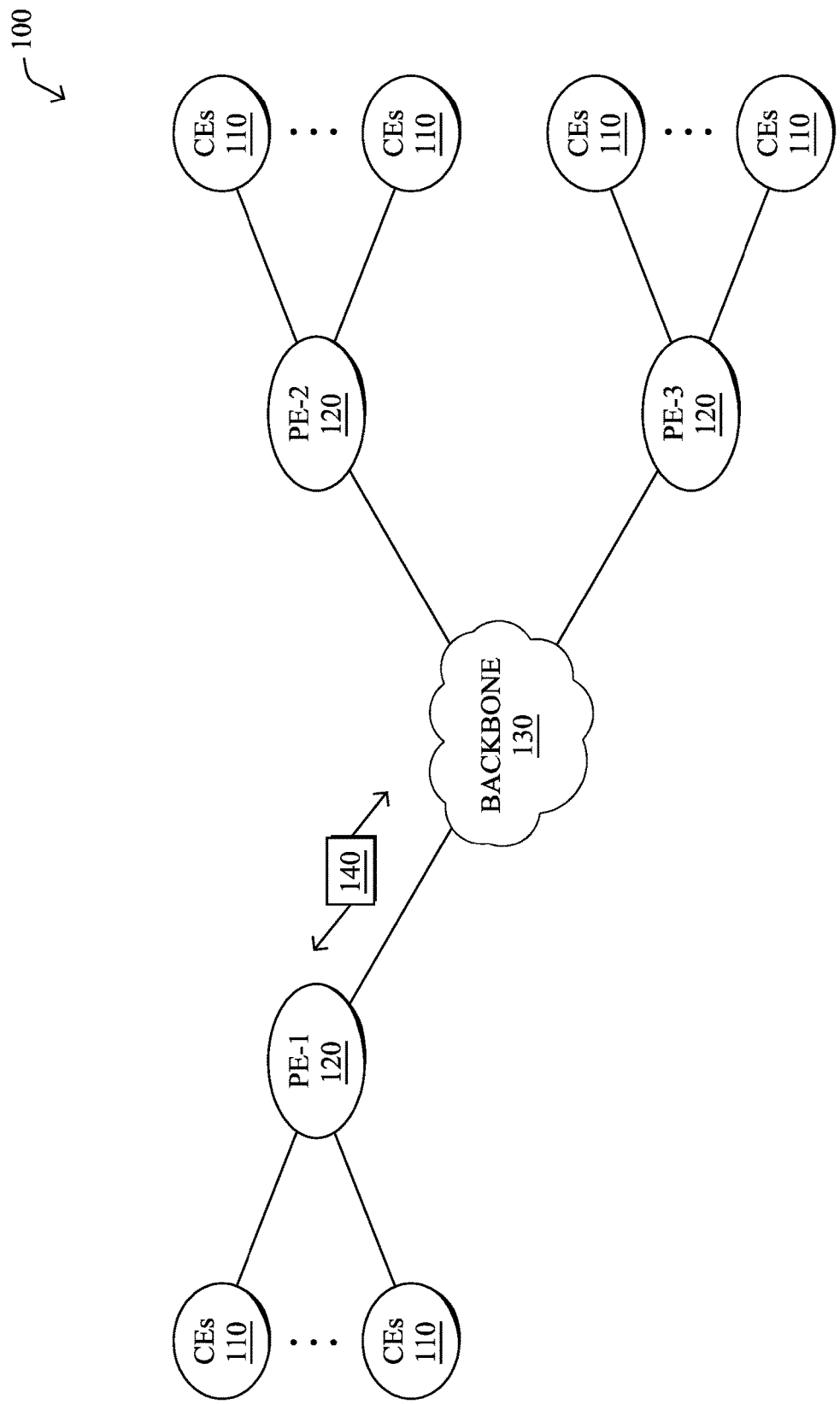
FIGS. 1A-1B illustrate an example communication network.

According to one or more embodiments of the disclosure, a network assurance service that monitors a network receives a plurality of key performance indicators (KPIs) for a networking device in the network over time. The network assurance service represents relationship changes between the KPIs over time as a set of one or more KPI trajectories. The network assurance service uses a machine learning-based model to determine that a behavior of the networking device is anomalous, based on the one or more KPI trajectories. The network assurance service provides an indication of the anomalous behavior of the networking device to a user interface.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
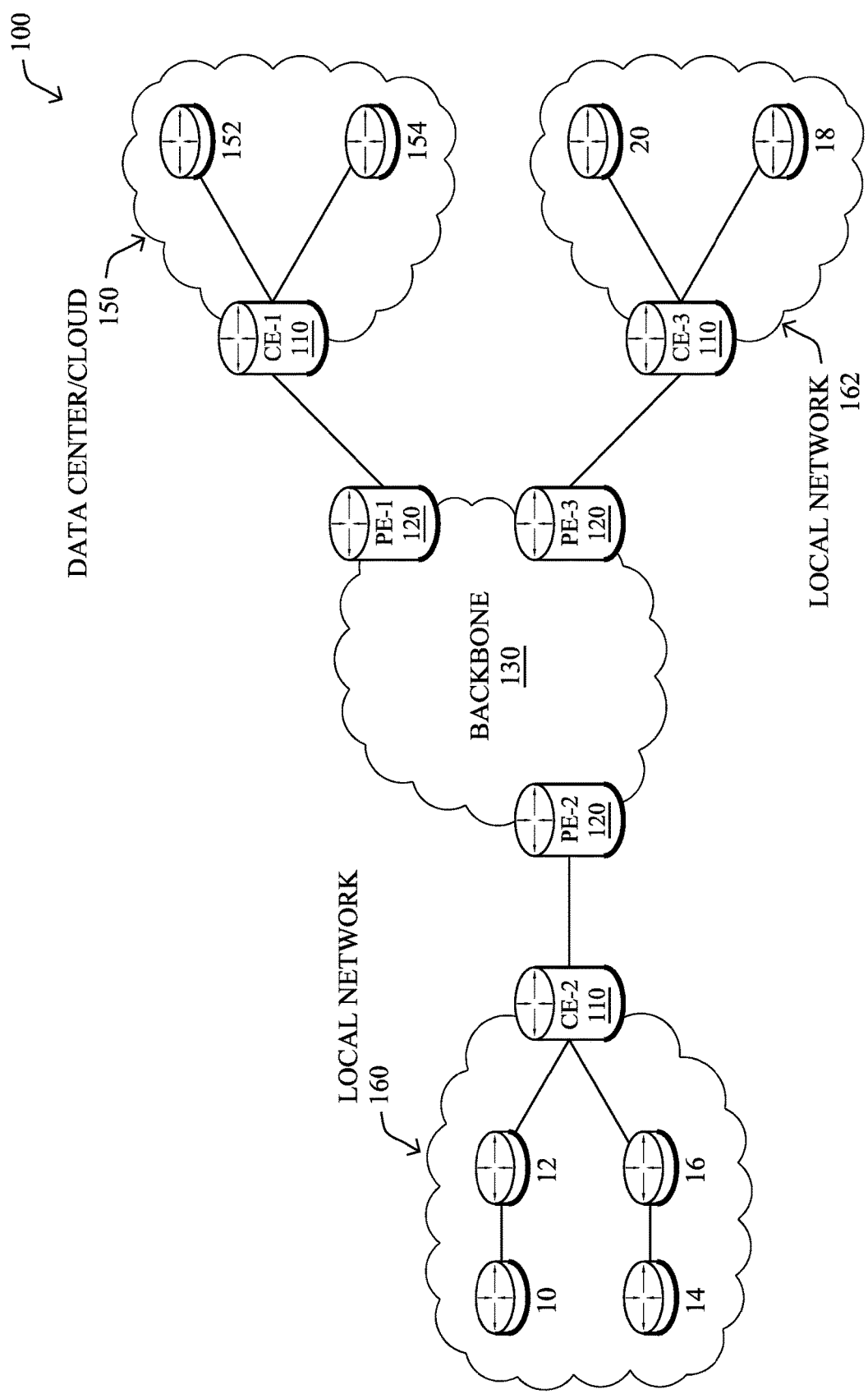

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
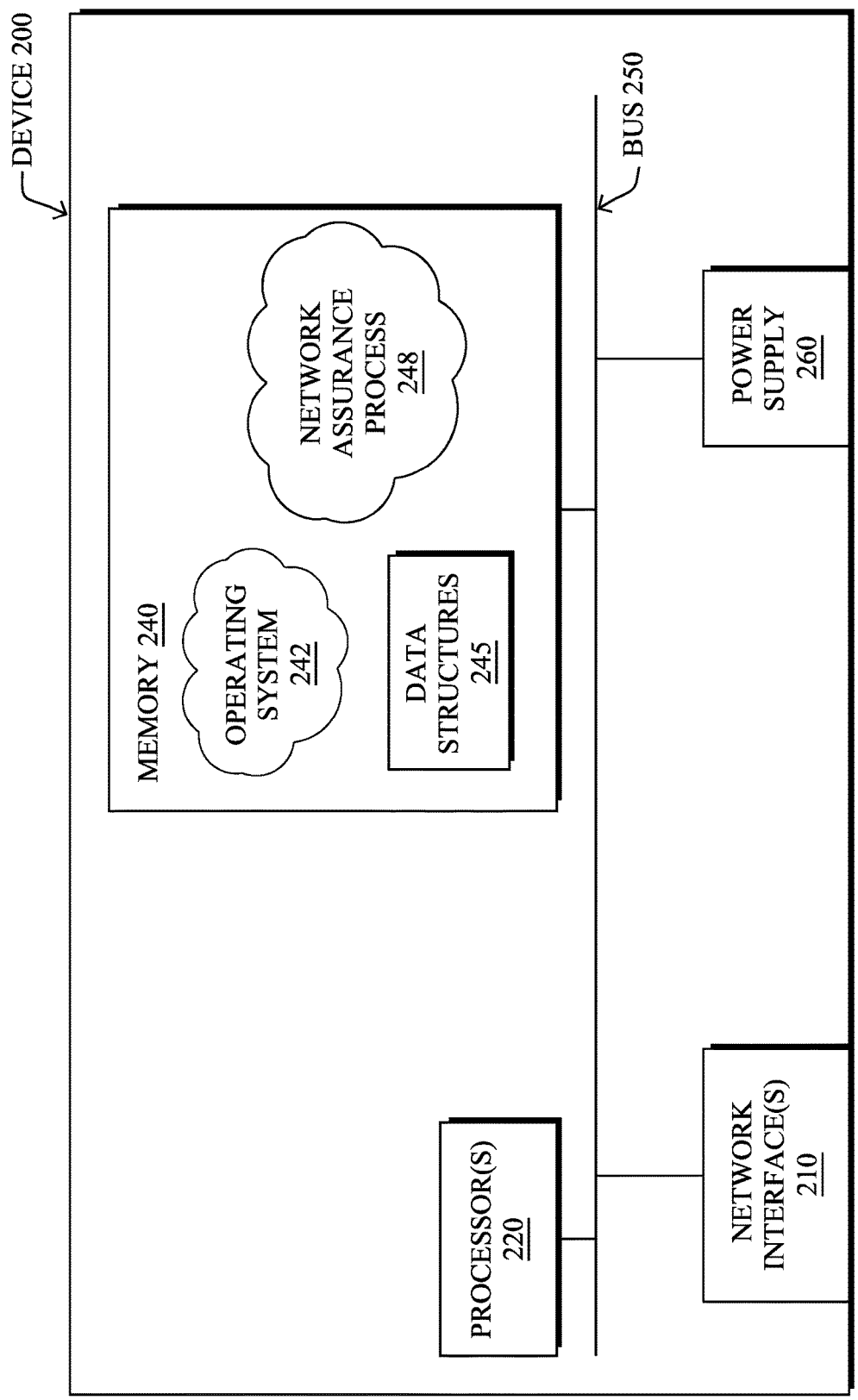
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance service. To evaluate a rule regarding these conditions, the network assurance service may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
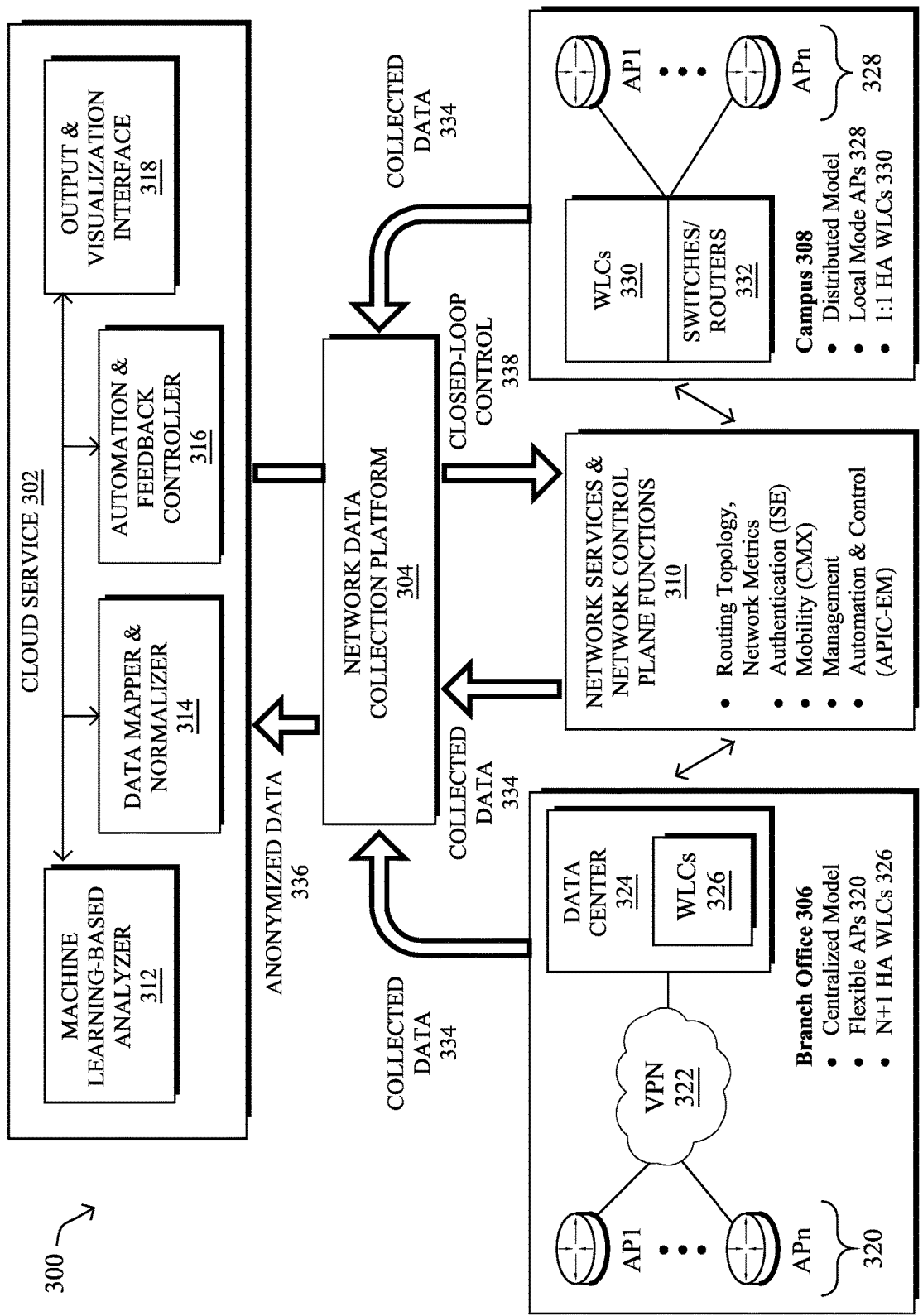
FIG. 3 illustrates an example network assurance system.

FIG. 3 illustrates an example network assurance system 300, according to various embodiments. As shown, at the core of network assurance system 300 may be a cloud-based network assurance service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point API through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point API through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP) v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, a network assurance system may leverage machine learning to detect anomalies and outlier behavior among a collection of networking devices (e.g., APs, AP controllers, switches, routers, etc.) based on any number of observed measurements/key performance indicators (KPIs). These KPIs may include, for example, metrics like utilization, client count, throughput, traffic, and the like. In turn, the network assurance system may combine these KPIs for analysis using techniques such as PCA, SVD, autoencoders, cross-signal correlation, etc. However, while autoencoders, for example, are capable of detecting behavioral anomalies that result from a change in correlations between KPIs, the root cause of the change, or even the interpretability of the inter-KPI changes from a user standpoint, remains lacking. More specifically, current analytics approaches today do not factor in the following:

Ways to detect whether a networking device has transitioned to another state, as defined by the KPIs which might only be representable as a different range of values.

Representing directions/trajectories, as defined by a user, in which a collection of KPIs move. For example, a sudden increase in utilization may always be accompanied by a dip in client count.

Ways to represent the flipping of correlations between KPIs. For example, assume that there are two KPIs: X and Y. It can very well be that X and Y are positively correlated during a first period of time, and then negatively correlated during a second period of time, etc. If the network assurance system only performs time series correlation on these two KPIs, it is extremely hard to see this pattern, as the computed correlation could show up as nearly zero. An example of this is shown in plot 400 in FIG. 4A. As shown, two KPIs, f1 and f2, may be positively correlated at certain times (e.g., between times T=1 and T=6) and negatively correlated during other times (e.g., between times T=7 and T=10). From a strictly mathematical standpoint, the correlation coefficient between these two KPIs over the entirety of plot 400 is 0.1, giving the false conclusion that the two KPIs are not strongly correlated.

Figure 4A:
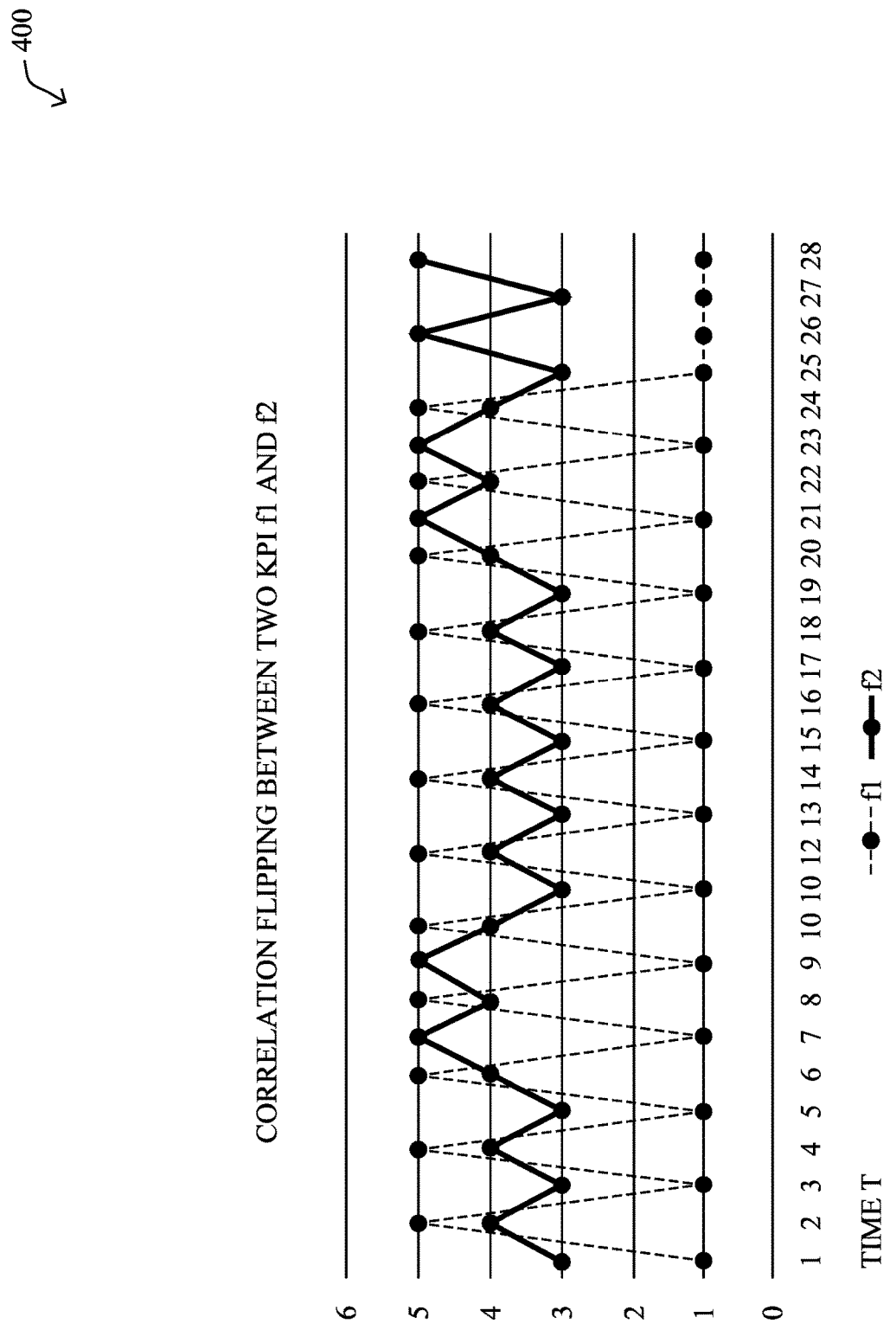
FIGS. 4A-4B illustrate examples of key performance indicator (KPI) correlation.
Figure 4B:
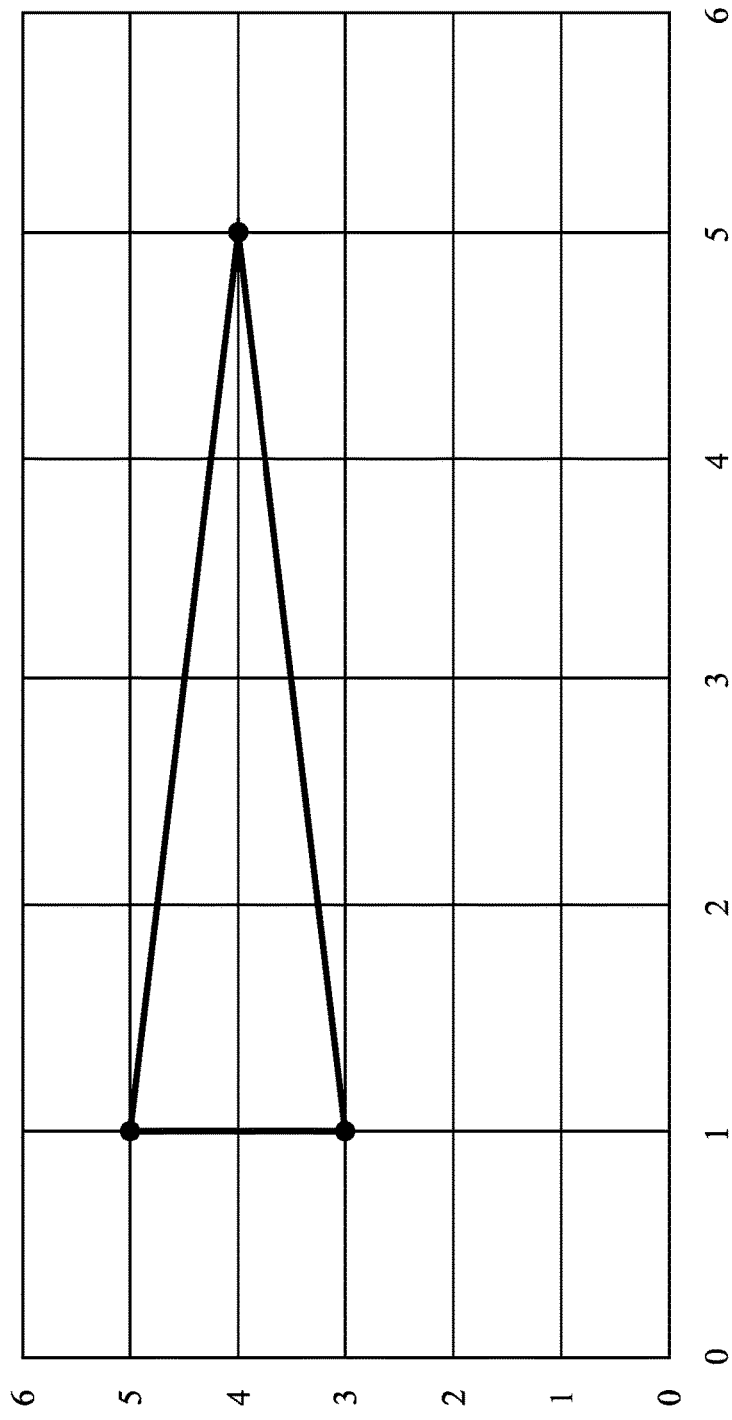

FIG. 4B illustrates a plot 410 of the correlation flipping of the KPIs of plot 400 in FIG. 4A represented as a trajectory. As shown, the pattern of correlation flipping is much easier to discern, when represented as a trajectory, with the values of f1 on the x-axis and the corresponding values of f2 on the y-axis. For example, between times T=1 and T=6 in FIG. 4A, f1 and f2 fluctuate between points (1,3) and (5,4) on the (x, y) plot 410 in FIG. 4B. However, between times T=7 and T=8 in plot 400 in FIG. 4A, the correlation between f1 and f2 reverses and is represented in plot 410 in FIG. 4B as a transition from (1,5) to (5,4) in the 'southeast' direction. The same transition is again seen between times T=9 and T=10, T=21 and T=22, and T=23 and T=24 in plot 400, when f1 and f2 are again negatively correlated. Thus, certain trajectory characteristics in FIG. 4B, such as a trajectory in the southeast direction, can be used to identify when the correlation between f1 and f2 changes. Preliminary testing has also shown that these types of trajectory patterns can be identified through the use of machine learning, as detailed below. Notably, these inter-KPI dynamics can be provided to a user of the network assurance service for review as trajectories, so as to build a training dataset for training a machine learning-based model capable of identifying anomalous devices. In contrast to representing the inter-KPI dynamics as long running time series, which can be difficult to render on a finite size screen, doing so as trajectories helps to present the dynamics in a visually dense, cognitive manner.

KPI Trajectory-Driven Outlier Detection in a Network Assurance System

The techniques herein allow for a network assurance system to detect abnormal inter-KPI changes of dynamics using new metrics that characterize the inter-KPI dynamics. In some aspects, the set of KPIs, specified as a feature space, may be defined by a user of the network assurance system, along with thresholds used to characterize anomalies, and augmented with a semi-supervised labeling approach. In further aspects, the service may inspect the potential feature spaces, and potential inter-KPI dynamics, in order to detect inter-KPI changes of dynamics that might be of interest.

Specifically, according to one or more embodiments of the disclosure as described in detail below, a network assurance service that monitors a network receives a plurality of key performance indicators (KPIs) for a networking device in the network over time. The network assurance service represents relationship changes between the KPIs over time as a set of one or more KPI trajectories. The network assurance service uses a machine learning-based model to determine that a behavior of the networking device is anomalous, based on the one or more KPI trajectories. The network assurance service provides an indication of the anomalous behavior of the networking device to a user interface.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 5:
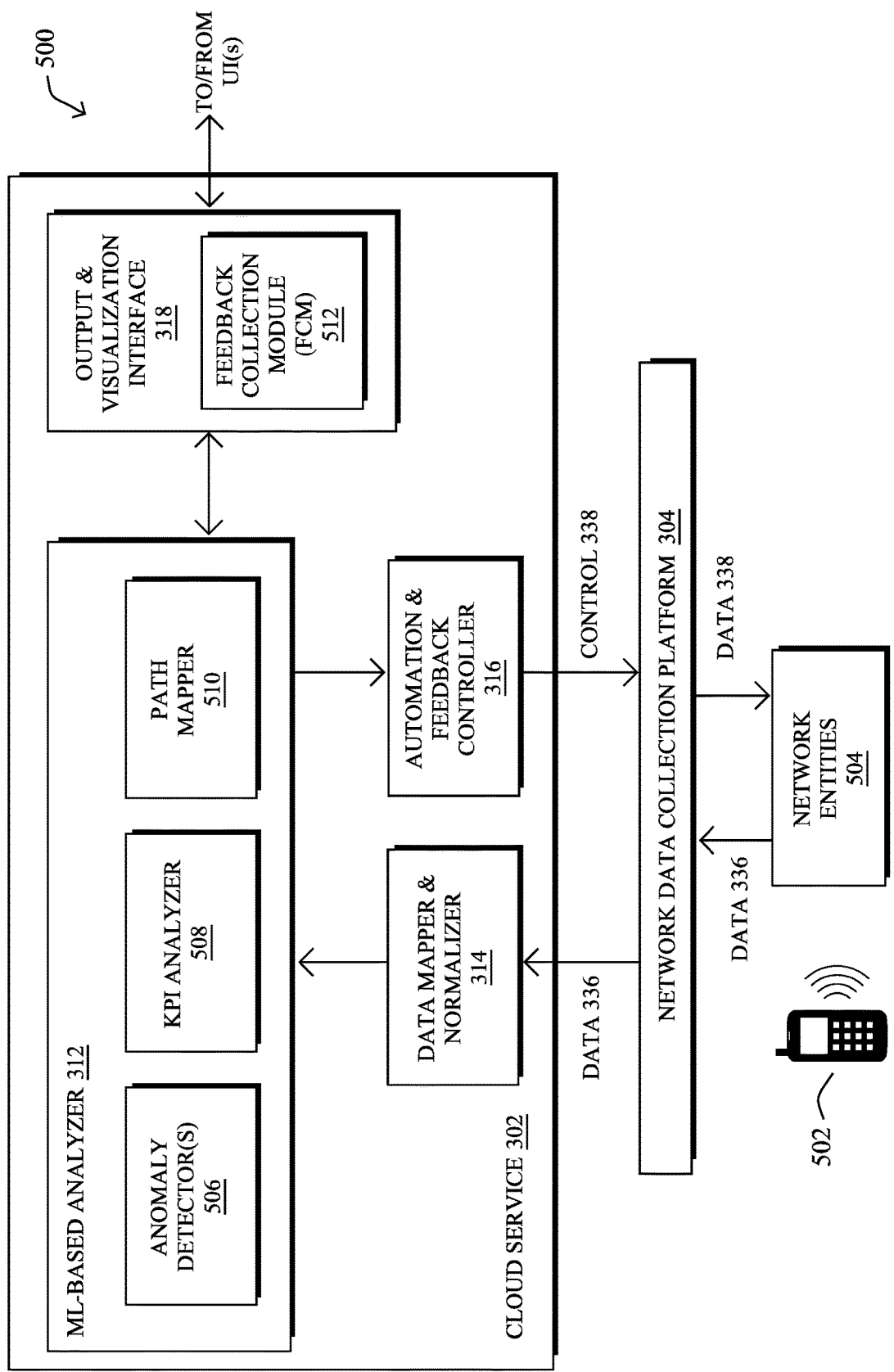
FIG. 5 illustrates an example architecture for performing KPI trajectory-driven outlier/anomaly detection.

Operationally, FIG. 5 illustrates an example architecture 500 for performing KPI trajectory-driven outlier/anomaly detection in a network assurance service, according to various embodiments. At the core of architecture 500 may be the following components: one or more anomaly detectors 506, a KPI analyzer 508, a path mapper 510, and/or a feedback collection module (FCM) 512. In some implementations, the components 506-512 of architecture 500 may be implemented within a network assurance system, such as system 300 shown in FIG. 3. Accordingly, the components 506-512 of architecture 500 shown may be implemented as part of cloud service 302 (e.g., as part of machine learning-based analyzer 312 and/or output and visualization interface 318), as part of network data collection platform 304, and/or on one or more network elements/entities 504 that communicate with one or more client devices 502 within the monitored network itself. Further, these components 506-512 may be implemented in a distributed manner or implemented as its own stand-alone service, either as part of the local network under observation or as a remote service. In addition, the functionalities of the components of architecture 500 may be combined, omitted, or implemented as part of other processes, as desired.

During operation, service 302 may receive telemetry data from the monitored network (e.g., anonymized data 336 and/or data 334) and, in turn, assess the data using one or more anomaly detectors 506. At the core of each anomaly detector 506 may be a corresponding anomaly detection model, such as an unsupervised learning-based model. When an anomaly detector 506 detects a network anomaly, output and visualization interface 318 may send an anomaly detection alert to a user interface (UI) for review by a subject matter expert (SME), network administrator, or other user. Notably, an anomaly detector 506 may assess any number of different network behaviors captured by the telemetry data (e.g., number of wireless onboarding failures, onboarding times, DHCP failures, etc.) and, if the observed behavior differs from the modeled behavior by a threshold amount, the anomaly detector 506 may report the anomaly to the user interface via network anomaly, output and visualization interface 318.

In addition to detecting anomalous behaviors on an individual or aggregate basis, service 302 may also identify changes in the relationships between measurements/KPIs of a certain networking device that are anomalous, according to various embodiments. To do so, KPI analyzer 508 may capture sets of KPIs where the detection of inter-KPI dynamics is of high interest and determine whether such dynamics are indicative of a behavioral anomaly by the networking device under scrutiny. For example, consider the case of two KPIs for an AP in a wireless network: client count and utilization. During normal operation of the AP, it would be expected that the measured utilization would rise or fall with the number of clients connected to the AP. If the opposite were true, however, such as the utilization of the AP increasing while its client count decreases, this can indicate a behavioral anomaly (e.g., due to a high level of interference, etc.). Through such analysis, service 302 can then send an alert or other indication regarding the detected anomaly to one or more user interfaces via output and visualization interface 318.

Two potential approaches to detecting anomalous inter-KPI dynamics are introduced herein. In one embodiment, KPI analyzer 508 may represent the inter-KPI dynamics over time as trajectories and, in turn, apply one or more thresholds to the characteristics of the trajectories, such as the magnitude, slope, or direction of the trajectories. For example, a drop in the utilization of an AP while its client count increases could be flagged by KPI analyzer 508 as anomalous, through analysis of its corresponding KPI trajectories. Notably, as described previously, an AP with KPI trajectories for utilization and client count that are in the south-east direction may be flagged as exhibiting anomalous behavior.

To better illustrate the idea of assessing the characteristics of KPI trajectories to identify anomalous device behaviors, one metric that KPI analyzer 508 may calculate and assess is the ratio of trajectories in the off-direction, as follows:

$$Off_{Directions} = \frac{\text{Lines headed SouthEast}}{\text{Total Line Segments}}$$

Lines/trajectories headed in the southeast direction are defined as ones have a slope greater than a predefined threshold, where the slope is defined as below:

$$\emptyset = \tan^{-1}\frac{\Delta y}{\Delta x}$$

Thus, in the case of AP utilization and client count, if the off directions metric for a given AP is greater than a predefined threshold, KPI analyzer 508 may flag that AP as potentially troublesome/anomalous and alert a network administrator.

Another metric that KPI analyzer 508 may consider is an off-lengths metric, defined as follows:

$$Off_{lengths} = \frac{\text{Lines of Magnitude} > \text{Threshold}}{\text{Total Line Segments}}$$

Here, KPI analyzer 508 may flag a networking device as behaving abnormally if the percentage or ratio of its trajectories that exceed a threshold magnitude to total number of trajectories/lines is above a certain value. For example, if an AP fluctuates between having a very high client count and utilization and a very low client count and utilization, this could also be deemed as anomalous, even though the KPI are still rising and falling with one another.

A third metric that KPI analyzer 508 may assess relates to off-speeds of the trajectories. In some cases, the lengths of the lines/trajectories may also be normalized by the time taken between sample points, as follows:

$$Off_{speed} = \frac{\text{Lines with speed of magnitude} > \text{Threshold}}{\text{Total Line Segments}}$$

Note, the off-speeds metric is related to the off-lengths metric above in the sense that when the time sampling is the same, the off-lengths are directly proportional to the off-speeds.

According to various embodiments, KPI analyzer 508 may include a machine learning-based model trained to determine whether a given networking device is an outlier/behaving anomaly, by assessing any or all of the metrics above. For example, such a model could be trained using semi-supervised learning by associating the trajectory metrics above with anomaly/outlier scores for different networking devices. In turn, the model can then assess the KPI metrics of another networking device, to determine whether the behavior of the device is considered anomalous.

By way of simple example, assume that KPI analyzer 508 computes off-lengths and off-direction metrics for the KPI trajectories of networking devices. In such a case, the machine learning-based model could be represented as a linear model with the off-lengths metric as X and the off-direction metric as Y, as follows:

$$P(\text{Outlier}|X1,X2) = \alpha_0 + \alpha_1 X + \alpha_2 Y$$

Note that the above is a very simple linear model and that more complex models/learning functions could also be used, in further embodiments.

Figure 6:
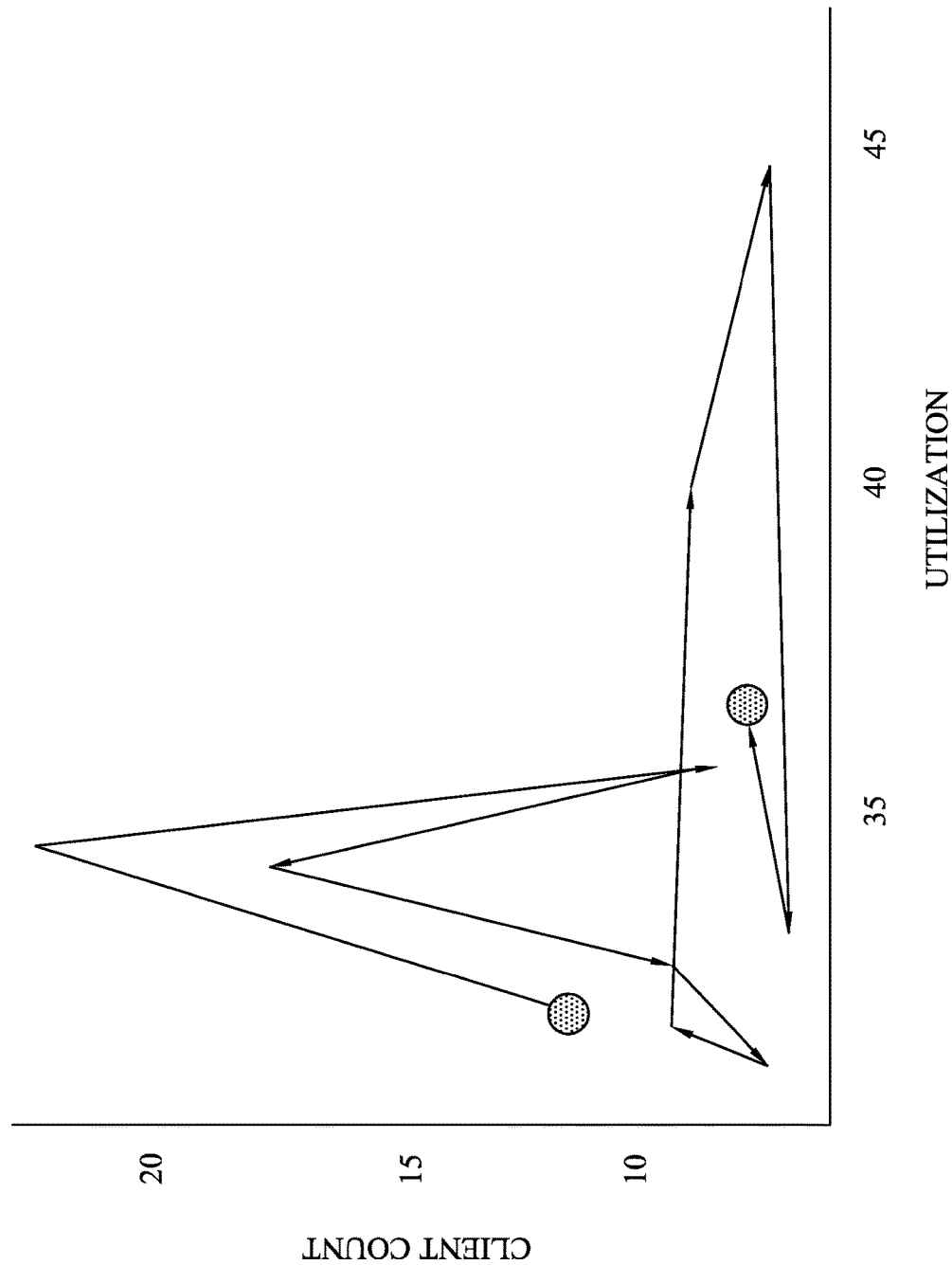
FIG. 6 illustrates an example plot of KPIs for an access point.

To train such a model, service 302 may seek user feedback regarding the KPI trajectories for any number of networking devices via FCM 512. For example, FIG. 6 illustrates an example plot 600 of KPI trajectories for an AP that plots the utilization of the AP on the x-axis versus the client count on the y-axis. The dashed line/trajectory shown indicates a south-east directional trajectory that could be considered anomalous, as the client count drops while the utilization of the AP increases.

Labeling of the training dataset by the user(s) may entail the user(s) inputting an overall anomaly score for the networking device, based on its plot of KPI trajectories. For example, the user may enter a score within the range of 1-100, to express how much of an outlier he or she considers the networking device to be. Such labels and KPI trajectories can then be used during training to learn the weights (or parameters) in the learning model. In other words, once trained, the machine learning-based model of KPI analyzer 508 may output an outlier/anomaly score for a networking device under scrutiny, based on its KPI trajectories. In turn, service 302 can use this score to report anomalies/outliers to the user interface(s) for correction.

In an alternate embodiment, labeling of the training dataset can be accomplished automatically by leveraging anomaly detector(s) 506. In turn, the anomaly scores applied to the different sets of KPI trajectories for the sample networking devices by anomaly detector(s) 506 can be used to train the model of KPI analyzer 508.

In further embodiments, another approach to detecting outlier networking devices based on their inter-KPI dynamics would be for trajectory/path mapper 510 to map the KPI trajectories of a device, as computed by KPI analyzer 508, to tensors. As would be appreciated, a tensor is a multi-dimensional array which conveniently allows for multiple mappings to be stacked. For example, in plot 410 in FIG. 4B, each trajectory can be viewed as crossing different cells of a grid. The algorithm would then proceed according to the following steps:

Initialize a grid (e.g., a 6×6 grid, in the case of plot 410 in FIG. 4B) and a tensor with values 0.

For every instance of a KPI trajectory traversing a cell of the initialized grid, increment a corresponding cell value in the tensor.

A machine learning-based model can be trained to identify anomalous-behaving devices from the KPI trajectory-mapped tensors, similar to the above approach with respect to the trajectory characteristics. For example, the tensor information could be provided to a user interface via FCM 512 for labeling feedback. In this case, however, the training process may differ slightly as follows:

The subject matter expert may classify a device as an outlier/anomalous or non-anomalous from its tensor information on a binary scale (e.g., anomalous or non-anomalous), as opposed to using a sliding scale.

The machine learning-based model may take the form of a deep convolutional neural network (CNN), to learn the classification.

At first glance, the trajectory characteristic approach and the tensor approach may appear very similar. However, the use of a CNN in the tensor-based approach also helps with regularization. Notably, a CNN has a power internal filter in its layers known as max-pooling, which has the effect of blurring the tensor and helps with regularization. This in turn helps performance in the classification of the device under scrutiny. Indeed, the mapping of time series KPI data to trajectories and the subsequent use of max-pooling has been shown to be quite promising during preliminary testing.

Another function of KPI analyzer 508 may be to auto-generate feature spaces where the inter-KPI dynamics are to be captured, in some embodiments. In contrast with the previous example where the 2-D space, such as client count and utilization, is used to detect outliers, KPI analyzer 508 may generate such a feature space (potentially generalized to N-dimensions), if the user(s) are capable of providing guidance on the various thresholds using supervised learning. One approach might consist of letting KPI analyzer 508 generate its own thresholds with the objective of limiting the number of top anomalies, and then show the user to get feedback via FCM 512. In other words, service 302 may obtain user feedback regarding whether the user deems the reported outlier devices are considered anomalous and, based on the feedback, adjust the model of KPI analyzer 508 so as to ensure that only truly anomalous/outlier devices are reported.

Figure 7:
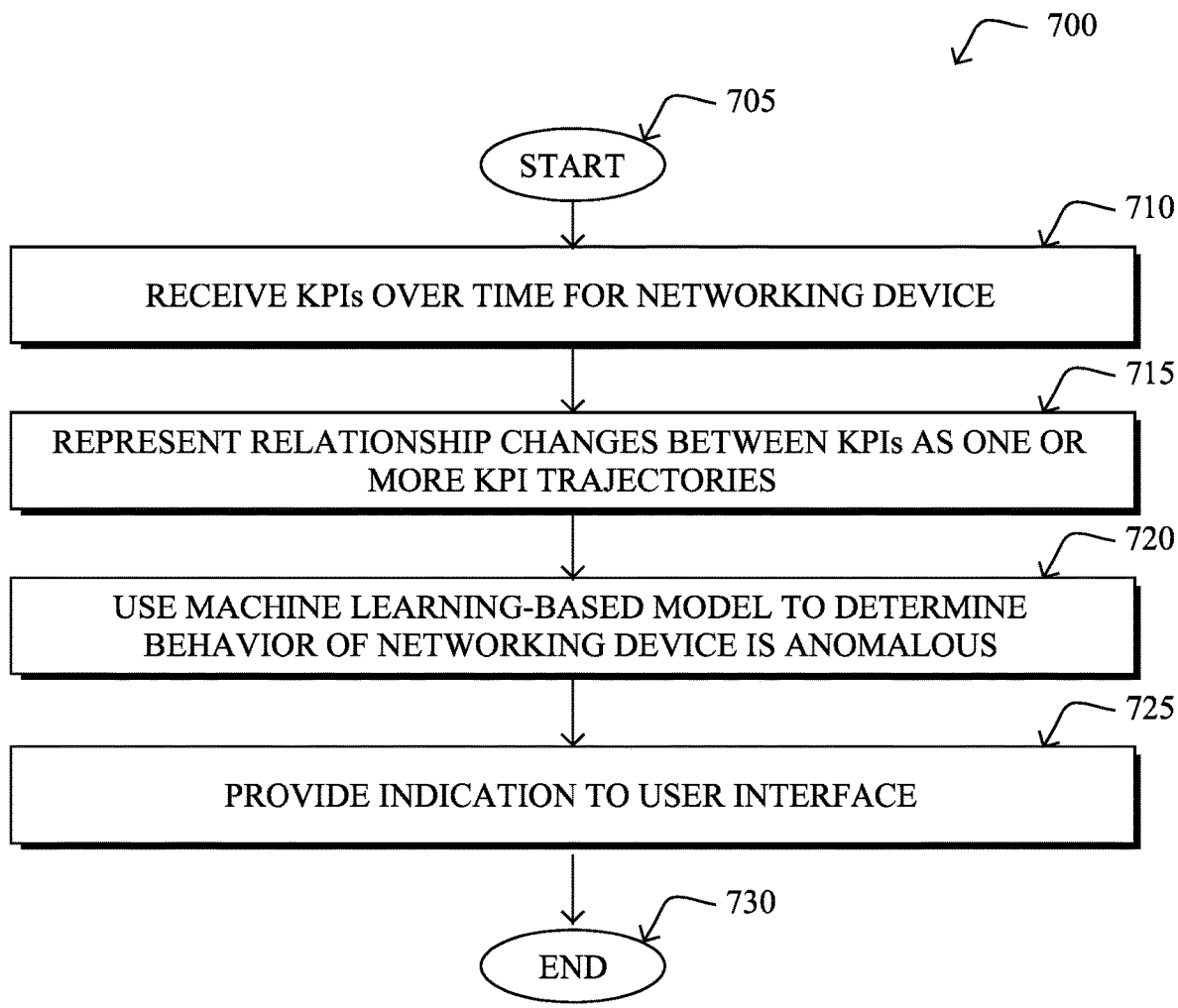
FIG. 7 illustrates an example simplified procedure for performing KPI trajectory-driven outlier detection.

FIG. 7 illustrates an example simplified procedure for performing KPI trajectory-driven outlier detection in a network assurance system, in accordance with one or more embodiments described herein. For example, a non-generic, specifically configured device (e.g., device 200) may perform procedure 700 by executing stored instructions (e.g., process 248), to provide a network assurance service to a monitored network. The procedure 700 may start at step 705, and continues to step 710, where, as described in greater detail above, the network assurance service may receive a plurality of key performance indicators (KPIs) for a networking device in the network over time. Such KPIs may include, for example, utilization, client count, throughput, traffic, etc. The networking device may generally be any device that supports communications in the network such as APs, WLCs or other AP controllers, switches, routers, and the like.

At step 715, as detailed above, the service may represent relationship changes between the KPIs over time as a set of one or more KPI trajectories. For example, in the simple 2-D case of an AP under scrutiny, the KPI trajectories may track the changes in the client count and utilization of the AP over time.

At step 720, the service may use a machine learning-based model to determine that a behavior of the networking device is anomalous, based on the one or more KPI trajectories, as described in greater detail above. In some embodiments, the model may flag a device as an outlier/behaving anomalously based on one or more characteristics of its KPI trajectories, such as the direction, magnitude, or speed of the one or more KPI trajectories of the device. In such cases, the model may be trained using a training dataset of KPI trajectories for a plurality of networking devices that have been labeled with anomaly scores provided as user feedback or, alternatively, by an anomaly detector. In further embodiments, the service may first map the KPI trajectories for the device under scrutiny to one or more tensors, for analysis by the model. In such cases, the model may be trained using a training dataset labeled by a user with binary labels and the model may take the form of a CNN.

At step 725, as detailed above, the service may provide an indication of the anomalous behavior of the networking device to a user interface. For example, in the case of an AP exhibiting an increase in utilization with a decrease in client count, the service may flag the AP as an outlier and notify a network administrator as to this anomalous behavior. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce an approach for using KPI trajectories to flag outlier networking devices exhibiting anomalous behaviors.

While there have been shown and described illustrative embodiments that provide for using KPI trajectories in a network assurance service, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a network assurance service that monitors a network, a plurality of key performance indicators (KPIs) for a networking device in the network over time;
representing, by the network assurance service, relationship changes between the KPIs over time as a set of one or more KPI trajectories;
using, by the network assurance service, a machine learning-based model to determine that a behavior of the networking device is anomalous, based on the one or more KPI trajectories; and
providing, by the network assurance service, an indication of the anomalous behavior of the networking device to a user interface,
wherein using the machine learning-based model to determine that the behavior of the networking device is anomalous comprises:
mapping the one or more KPI trajectories to one or more KPI-based tensors; and
using the one or more KPI-based tensors as input to the machine learning-based model.

2. The method as in claim 1, wherein the networking device comprises a wireless access point or wireless access point controller.

3. The method as in claim 1, wherein the machine learning-based model determines that the behavior of the networking device is anomalous based on at least one of: a direction, magnitude, or speed of the one or more KPI trajectories.

4. The method as in claim 3, further comprising:
using sample KPI trajectories for a plurality of networking devices as input to an anomaly detector, to obtain anomaly scores for the plurality of networking devices; and
training the machine learning-based model using the obtained anomaly scores.

5. The method as in claim 3, further comprising:
receiving user feedback regarding sample KPI trajectories for a plurality of networking devices, wherein the user feedback comprises anomaly scores for the plurality of networking devices; and
training the machine learning-based model using the user feedback.

6. The method as in claim 1, wherein the machine learning-based model comprises a convolutional neural network.

7. The method as in claim 1, wherein the machine learning-based model is trained using a training dataset comprising KPI tensors associated with a plurality of networking devices and binary labels that label each of the plurality of networking devices as anomalous or non-anomalous.

8. The method as in claim 1, wherein the plurality of KPIs comprise one or more of: utilization, client count, or throughput.

9. An apparatus, comprising:
one or more network interfaces to communicate with a network;
a processor coupled to the network interfaces and configured to execute one or more processes; and
a memory configured to store a process executable by the processor, the process when executed configured to:
receive a plurality of key performance indicators (KPIs) for a networking device in the network over time;
represent relationship changes between the KPIs over time as a set of one or more KPI trajectories;
use a machine learning-based model to determine that a behavior of the networking device is anomalous, based on the one or more KPI trajectories; and
provide an indication of the anomalous behavior of the networking device to a user interface,
wherein the apparatus uses the machine learning-based model to determine that the behavior of the networking device is anomalous by:
mapping the one or more KPI trajectories to one or more KPI-based tensors; and
using the one or more KPI-based tensors as input to the machine learning-based model.

10. The apparatus as in claim 9, wherein the networking device comprises a wireless access point or wireless access point controller.

11. The apparatus as in claim 9, wherein the plurality of KPIs comprise one or more of: utilization, client count, or throughput.

12. The apparatus as in claim 9, wherein the machine learning-based model determines that the behavior of the networking device is anomalous based on at least one of: a direction, magnitude, or speed of the one or more KPI trajectories.

13. The apparatus as in claim 12, wherein the process when executed is further configured to:
receive user feedback regarding sample KPI trajectories for a plurality of networking devices, wherein the user feedback comprises anomaly scores for the plurality of networking devices; and
train the machine learning-based model using the user feedback.

14. The apparatus as in claim 9, wherein the machine learning-based model is trained using a training dataset comprising KPI tensors associated with a plurality of networking devices and binary labels that label each of the plurality of networking devices as anomalous or non-anomalous.

15. The apparatus as in claim 9, wherein the machine learning-based model comprises a convolutional neural network.

16. A tangible, non-transitory, computer-readable medium storing program instructions that cause a network assurance service to execute a process comprising:
receiving, at the network assurance service, a plurality of key performance indicators (KPIs) for a networking device in the network over time;
representing, by the network assurance service, relationship changes between the KPIs over time as a set of one or more KPI trajectories;
using, by the network assurance service, a machine learning-based model to determine that a behavior of the networking device is anomalous, based on the one or more KPI trajectories; and
providing, by the network assurance service, an indication of the anomalous behavior of the networking device to a user interface,
wherein using the machine learning-based model to determine that the behavior of the networking device is anomalous comprises:
mapping the one or more KPI trajectories to one or more KPI-based tensors; and
using the one or more KPI-based tensors as input to the machine learning-based model.

17. The computer-readable medium as in claim 16, wherein the networking device comprises a wireless access point or wireless access point controller.

18. The computer-readable medium as in claim 16, wherein the machine learning-based model determines that the behavior of the networking device is anomalous based on at least one of: a direction, magnitude, or speed of the one or more KPI trajectories.

19. A method comprising:
receiving, at a network assurance service that monitors a network, a plurality of key performance indicators (KPIs) for a networking device in the network over time;
representing, by the network assurance service, relationship changes between the KPIs over time as a set of one or more KPI trajectories;
using, by the network assurance service, a machine learning-based model to determine that a behavior of the networking device is anomalous, based on the one or more KPI trajectories, wherein the machine learning-based model determines that the behavior of the networking device is anomalous based on at least one of: a direction, magnitude, or speed of the one or more KPI trajectories;

providing, by the network assurance service, an indication of the anomalous behavior of the networking device to a user interface;

receiving user feedback regarding sample KPI trajectories for a plurality of networking devices, wherein the user feedback comprises anomaly scores for the plurality of networking devices; and training the machine learning-based model using the user feedback.

\* \* \* \* \*

UNITED STATES PATENT AND TRADEMARK OFFICE
CERTIFICATE OF CORRECTION

PATENT NO. : 10,904,114 B2  
APPLICATION NO. : 16/263323  
DATED : January 26, 2021  
INVENTOR(S) : Sajjit Thampy et al.

Page 1 of 1

It is certified that error appears in the above-identified patent and that said Letters Patent is hereby corrected as shown below:

In the Specification

Column 7, Line 38, please amend as shown:  
AP1 through nth access point, APn) through which endpoint Column 7, Line 53, please amend as shown:  
AP1 through nth access point APm) that provide connectiv- Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*